(12) United States Patent
Huang

(10) Patent No.: US 8,316,511 B2
(45) Date of Patent: Nov. 27, 2012

(54) APPARATUS FOR TIGHTENING TWO BELTS

(76) Inventor: Han-Ching Huang, Taichung (TW)

( * ) Notice: Subject to any disclaimer, the term of this patent is extended or adjusted under 35 U.S.C. 154(b) by 121 days.

(21) Appl. No.: 12/938,220

(22) Filed: Nov. 2, 2010

(65) Prior Publication Data

US 2012/0102690 A1 May 3, 2012

(51) Int. Cl.
B25B 25/00 (2006.01)
(52) U.S. Cl. ...................... 24/68 CD; 24/909
(58) Field of Classification Search ............... 24/68 CD, 24/909; 410/100; 242/388, 388.1, 388.4, 242/579, 613.4, 613.5
See application file for complete search history.

(56) References Cited

U.S. PATENT DOCUMENTS

| | | | | |
|---|---|---|---|---|
| 152,321 A * | 6/1874 | Beck | ............ | 242/613.5 |
| 752,329 A * | 2/1904 | Clegg | ............ | 242/609.2 |
| 786,698 A * | 4/1905 | Wardwell | ............ | 242/118.32 |
| 801,576 A * | 10/1905 | Elixman et al. | ............ | 242/599.2 |
| 1,008,924 A * | 11/1911 | Orr | ............ | 242/613.5 |
| 1,046,532 A * | 12/1912 | Zabriskie | ............ | 242/613.5 |
| 1,222,943 A * | 4/1917 | Gammeter | ............ | 242/613.5 |
| 1,919,769 A * | 7/1933 | Brown et al. | ............ | 242/613.5 |
| 2,694,534 A * | 11/1954 | Stingle et al. | ............ | 242/609.4 |
| 3,749,366 A * | 7/1973 | Brucker | ............ | 24/68 CD |
| 4,191,109 A * | 3/1980 | Wickenberg | ............ | 410/149 |
| 4,484,715 A * | 11/1984 | DeMarco et al. | ............ | 242/613.5 |
| 4,547,417 A * | 10/1985 | DeMarco et al. | ............ | 428/66.3 |
| 4,951,365 A * | 8/1990 | Loyd | ............ | 24/68 CD |
| 5,381,984 A * | 1/1995 | Hindsgual | ............ | 242/613.5 |
| 5,857,643 A * | 1/1999 | Czuprynski et al. | ............ | 242/613 |
| 5,933,923 A * | 8/1999 | Catlos et al. | ............ | 24/68 CD |
| 5,975,455 A * | 11/1999 | Alegre | ............ | 242/396.4 |
| 6,042,048 A * | 3/2000 | Czuprynski et al. | ............ | 242/613 |
| 6,711,786 B2 * | 3/2004 | Mamie et al. | ............ | 24/68 CD |
| 2003/0000047 A1 * | 1/2003 | Mamie et al. | ............ | 24/68 CD |
| 2005/0278902 A1 * | 12/2005 | Wilcox et al. | ............ | 24/68 CD |
| 2007/0283540 A1 * | 12/2007 | Chang | ............ | 24/68 CD |

* cited by examiner

*Primary Examiner* — Robert J Sandy
*Assistant Examiner* — Abigail E Morrell

(57) ABSTRACT

A belt-tightening apparatus includes a frame, a handle, a shaft, two ratchet wheels, two spring-biased detents and a connector. The shaft is used to rotationally connect the handle to the frame and wind a first belt. The ratchet wheels are connected to the shaft. The first spring-biased detent is movably connected to the handle for engagement with the ratchet wheels. The second spring-biased detent is movably connected to the frame for engagement with the ratchet wheels. The connector includes a tube and a reinforcement strip. The tube is connected to the frame on one hand and connected to the second belt on the other hand. The reinforcement strip is inserted in the tube for reinforcing the tube.

6 Claims, 4 Drawing Sheets

APPARATUS FOR TIGHTENING TWO BELTS

BACKGROUND OF INVENTION

1. Field of Invention

The present invention relates to an apparatus for tightening two belts and, more particularly, to a belt-tightening apparatus equipped with an inexpensive and robust element for connecting one of the belts.

2. Related Prior Art

It is not reliable to use bare hands to operate a belt or string to tie cargo. In such a case, the cargo could easily get loose and fall and get damaged during transportation. To solve this problem, belt-tightening apparatuses have been devised to tighten belts wound around cargo.

A conventional belt-tightening apparatus includes a frame, a handle, a shaft for rotationally connecting the handle to the frame, a threaded bolt inserted through the frame, and a nut engaged with the threaded bolt. A first belt is wound on the shaft. A second belt is formed with a loop located around the threaded bolt. The first and second belts are tied to a platform of a trailer for example. By pivoting the handle relative to the frame repeatedly, the first belt is reeled in so that the first and second belts are tightened and that cargo is securely tied to the platform of the trailer. The cost of material for making the threaded bolt and the nut is high. The cost of labor for engaging the threaded bolt with the nut is high. The engagement of the threaded bolt with the nut is not reliable because it would get slack due to vibration occurred during the transportation. Hence, the cargo is insecure, and a user is unsafe.

As disclosed in Taiwanese Patent Nos. M351804 and M351805, a belt-tightening apparatus includes an integral element or combinative unit instead of the combination of the threaded bolt with the nut. The integral element or combinative unit includes a strip made with a structure that looks like a "U" in a cross-sectional view. The strip could however be deformed under a heavy load from the second belt. The belt-tighten apparatus would be out of order in such a case.

The present invention is therefore intended to obviate or at least alleviate the problems encountered in prior art.

SUMMARY OF INVENTION

It is the primary objective of the present invention to provide a belt-tighten apparatus with an inexpensive and robust unit for connecting a belt.

To achieve the foregoing objective, the belt-tightening apparatus includes a frame, a handle, a shaft, two ratchet wheels, two spring-biased detents and a connector. The shaft is used to rotationally connect the handle to the frame and wind a first belt. The ratchet wheels are connected to the shaft. The first spring-biased detent is movably connected to the handle for engagement with the ratchet wheels. The second spring-biased detent is movably connected to the frame for engagement with the ratchet wheels. The connector includes a tube and a reinforcement strip. The tube is connected to the frame on one hand and connected to the second belt on the other hand. The reinforcement strip is inserted in the tube for reinforcing the tube.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
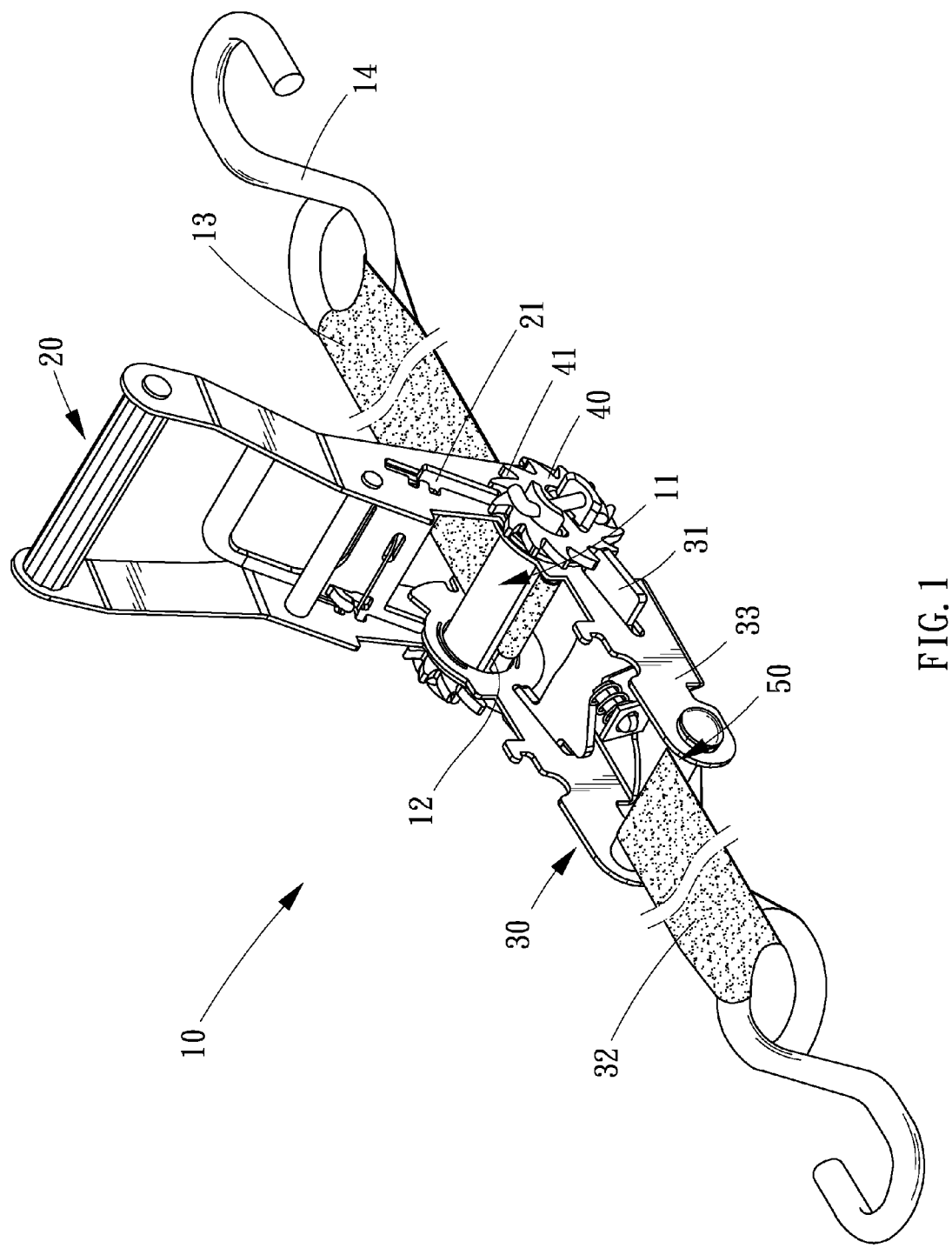
FIG. 1 is a perspective view of a belt-tightening apparatus equipped with an inexpensive and robust connector according to the preferred embodiment of the present invention.

Referring to FIG. 1, a belt-tightening apparatus 10 includes a frame 30, a handle 20, a shaft 11, two ratchet wheels 40, two spring-biased detents 21 and 31 and a connector 50 according to the preferred embodiment of the present invention. The frame 30 includes two walls 33 extending from a floor. Each of the walls 33 includes an aperture 34 defined therein. The aperture 34 of each wall 33 is oval.

The handle 20 is rotationally connected to the frame 30 by the shaft 11. The handle 20 can only be spun together with the shaft 11. The shaft 11 includes two halves separated from each other by a gap 12.

The connector 50 includes two ends inserted through the apertures 34. Thus, the connector 50 is connected to the frame 30.

An end of a first belt 13 is inserted through the gap 12. The first belt 13 is wound onto the shaft 11 when the shaft 11 is spun. A hook 14 is tied to another end of the first belt 13.

An end of a second belt 32 is made into a loop. The connector 50 is inserted through the loop of the second belt 32. Another hook 14 is tied to another end of the second belt 32.

The ratchet wheels 40 are connected to the shaft 11. Thus, the ratchet wheels 40 can only be spun together with the shaft 11. Each of the ratchet wheels 40 include ratchets 41.

The first spring-biased detent 21 is movably located on the handle 20. The second spring-biased detent 31 is movably located on the frame 30. The spring-biased detents 21 and 31 can be engaged with the ratchet wheels 40 alternately. The cooperation of the spring-biased detents 21 and 31 with the ratchet wheels 40 will not be described in detail for not being the spirit of the present invention.

In use, each of the hooks 14 is engaged with a portion of a platform of a trailer for example. The handle 20 is pivoted relative to frame 30 repeatedly to wound the first belt 13 onto the shaft 11 since the spring-biased detents 21 and 31 are engaged with and disengaged from the ratchets wheels 40 alternately. Thus, the belts 13 and 32 are tightened to securely fasten cargo on the platform of the trailer.

Figure 2:
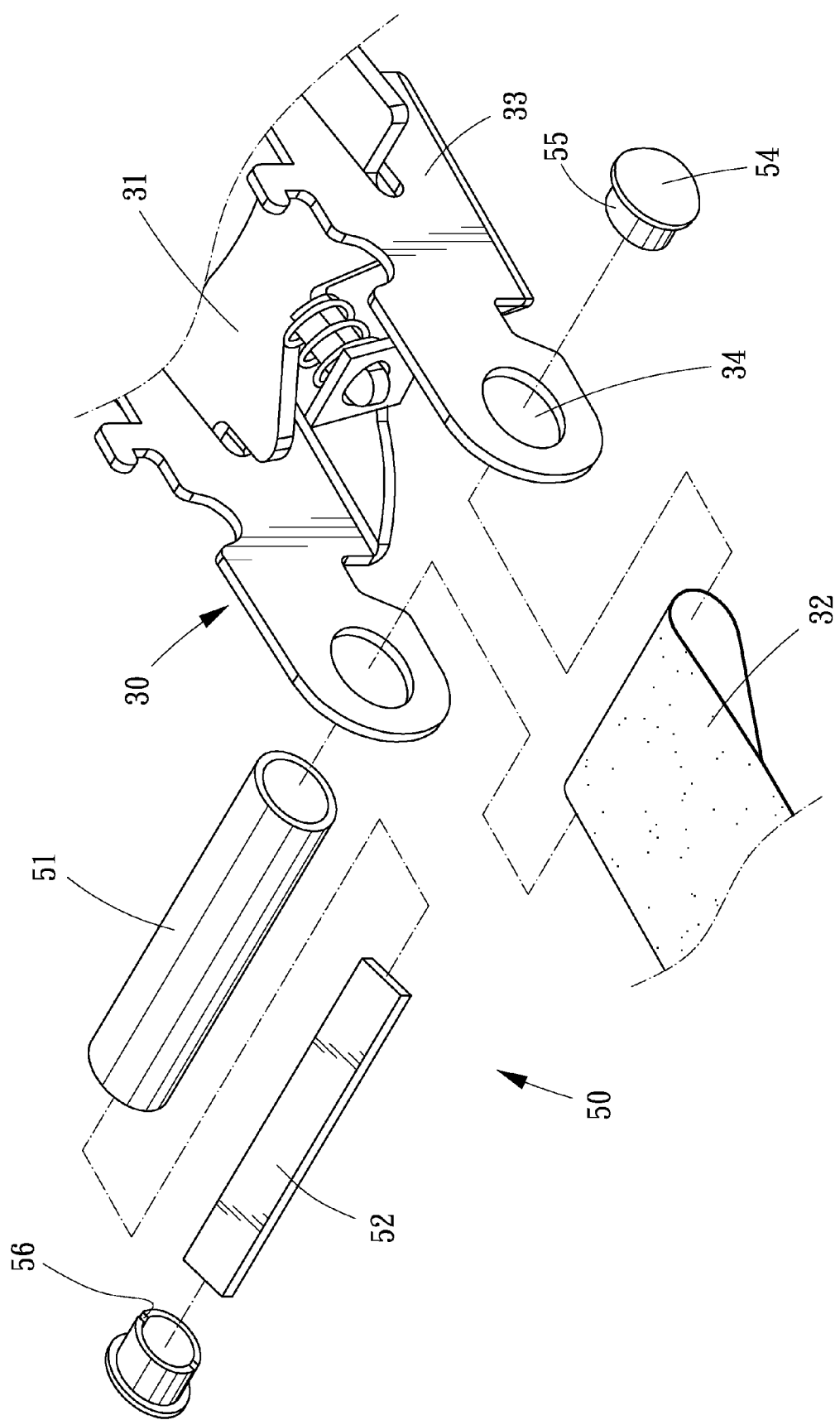
FIG. 2 is an exploded view of the connector shown in FIG. 1.
Figure 3:
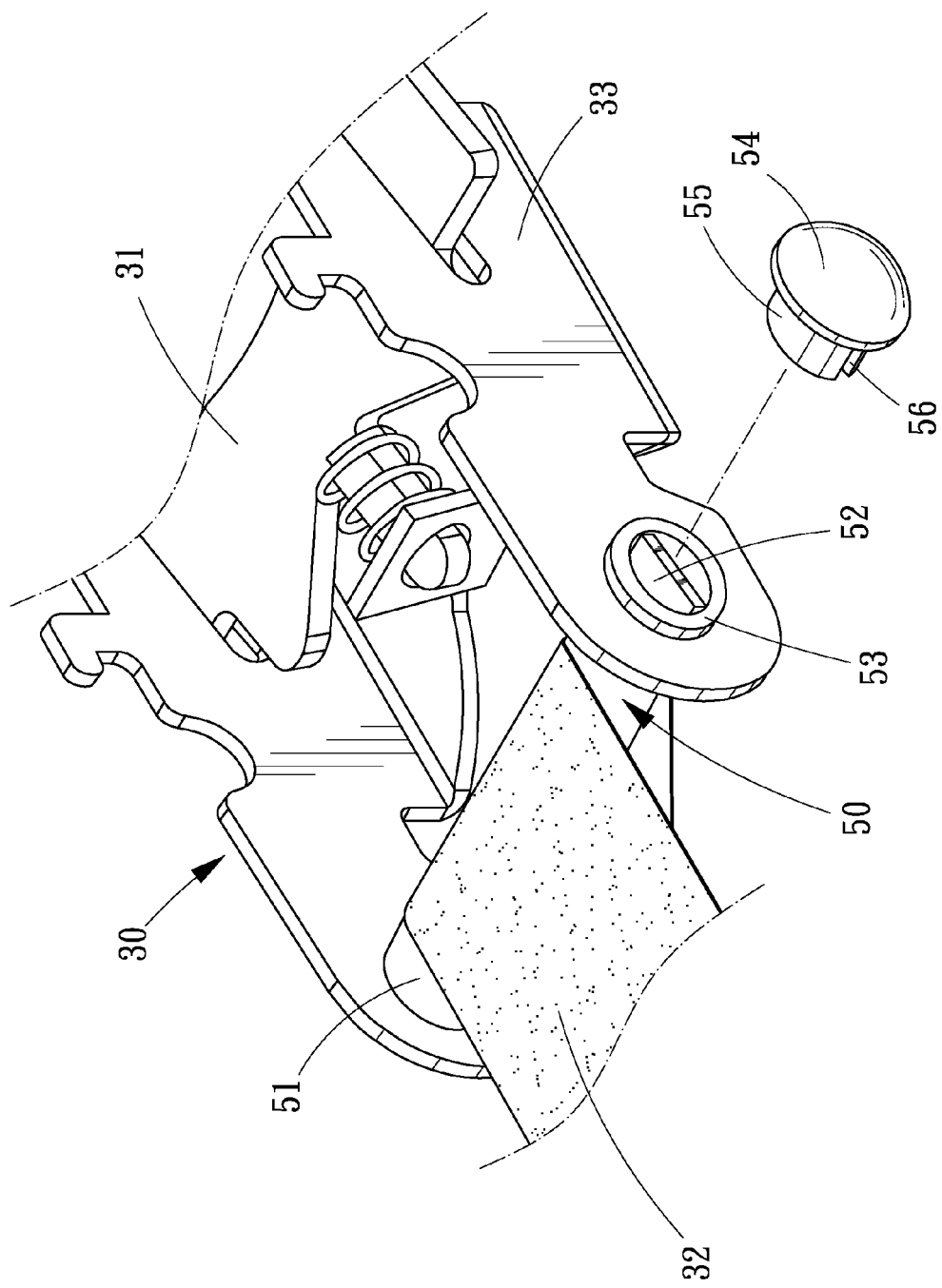
FIG. 3 is a perspective view of the connector shown in FIG. 2.
Figure 4:
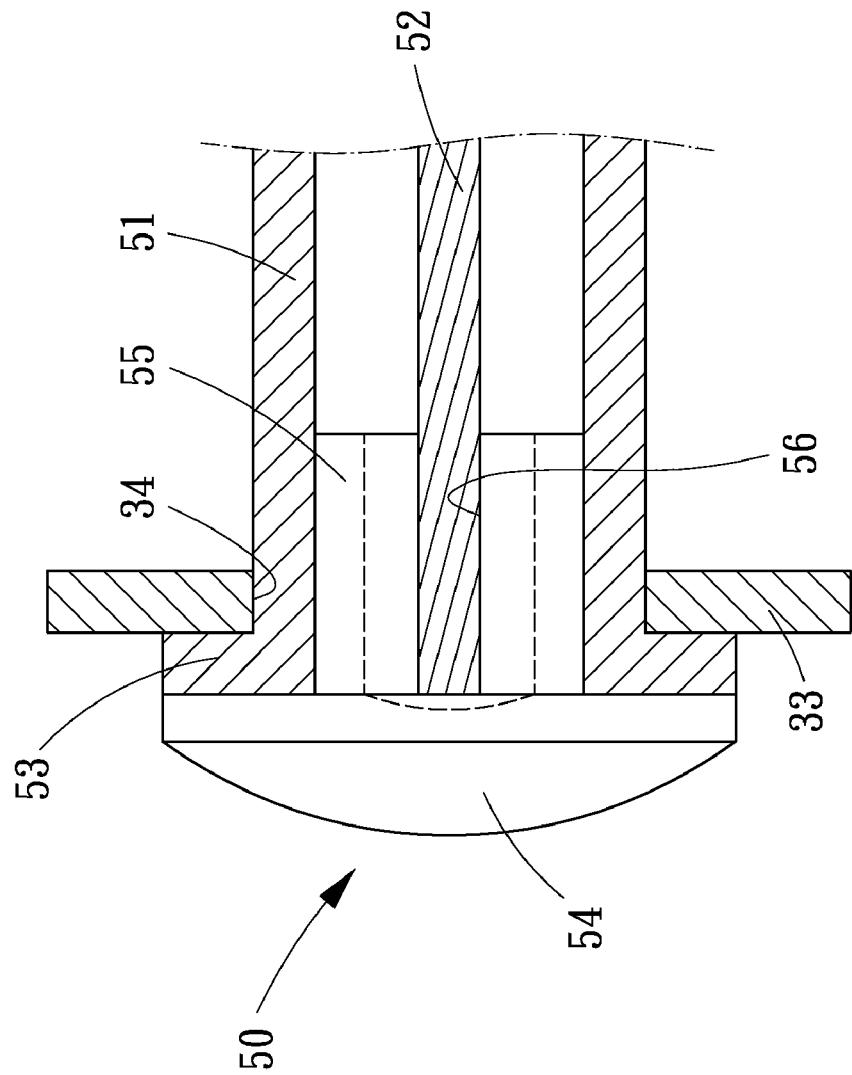
FIG. 4 is a cross-sectional view of the connector shown in FIG. 3.

Referring to FIGS. 2 through 4, the connector 50 includes a tube 51, a reinforcement strip 52 and two covers 54. The tube 51 includes an oval profile when it is viewed in a longitudinal direction.

The reinforcement strip 52 includes a rectangular configuration in a front view. The reinforcement strip 52 is inserted in the tube 51. Two opposite rectilinear edges of the reinforcement strip 52 are secured to an internal face of the tube 51 by welding for example.

Each of the covers 54 includes a plug 55 extending from a side thereof. The plug 55 of each of the covers 54 includes two halves separated from each other by a slit 56.

In assembly, the tube 51 is inserted through the loop of the second belt 32. Each end of the tube 51 is inserted through a related one of the apertures 34. Thus, the tube 51 is non-rotationally connected to the frame 30. Each of the ends of the tube 51 is made into an enlarged flange 53 by punching for example. Thus, the tube 51 is retained on the frame 30. The plug 55 of each of the covers 54 is fit in a related one of the ends of the tube 51 while each end of the reinforcement strip 52 is located in the slit 56 of each of the covers 54.

The cost of the material for making the tube 51 and the reinforcement strip 52 is low. The cost in connecting the tube 51 to the reinforcement strip 52 is low. The cost in making the enlarged flanges 53 is low. The connector 50 is robust because the tube 51 is reinforced by the reinforcement strip 52.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A belt-tightening apparatus including a frame, a handle, a shaft for rotationally connecting the handle to the frame and winding a first belt, two ratchet wheels connected to the shaft, a first spring-biased detent movably connected to the handle for engagement with the ratchet wheels, a second spring-biased detent movably connected to the frame for engagement with the ratchet wheels, and a connector including:
   a tube connected to the frame and a second belt, wherein the tube includes two ends each made into an enlarged flange for retaining the tube on the frame; and
   a reinforcement strip inserted in the tube for reinforcing the tube.

2. The belt-tightening apparatus according to claim 1, wherein the tube includes an oval profile, wherein the frame includes two walls each including an oval aperture for receiving the tube.

3. The belt-tightening apparatus according to claim 1, wherein the connector includes two covers for covering two opposite ends of the tube.

4. The belt-tightening apparatus according to claim 3, wherein each of the covers includes a plug fit in the tube.

5. The belt-tightening apparatus according to claim 4, wherein the plug of each of the covers includes a slit for receiving an end of the reinforcement strip.

6. A belt-tightening apparatus including a frame, a handle, a shaft for rotationally connecting the handle to the frame and winding a first belt, two ratchet wheels connected to the shaft, a first spring-biased detent movably connected to the handle for engagement with the ratchet wheels, a second spring-biased detent movably connected to the frame for engagement with the ratchet wheels, and a connector including:
   a tube connected to the frame and a second belt; and
   a rectangular reinforcement strip inserted in and secured to the tube by welding for reinforcing the tube.

* * * * *